(12) United States Patent  
Dykstra et al.

(10) Patent No.: US 6,950,634 B2
(45) Date of Patent: Sep. 27, 2005

(54) TRANSCEIVER CIRCUIT ARRANGEMENT AND METHOD

(75) Inventors: Jeffrey A Dykstra, Palatine, IL (US); Nebil Tanzi, Hoffman Estates, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 539 days.

(21) Appl. No.: 10/154,126

(22) Filed: May 23, 2002

(65) Prior Publication Data

US 2003/0220081 A1 Nov. 27, 2003

(51) Int. Cl.$^7$ .............................. H04B 1/44; H04B 1/46
(52) U.S. Cl. .............................. 455/78; 455/82; 455/83
(58) Field of Search .............................. 455/80, 82, 83, 455/78, 75, 76

(56) References Cited

U.S. PATENT DOCUMENTS

| | | | | |
|---|---|---|---|---|
| 4,417,157 A | * | 11/1983 | Gershberg et al. | 327/502 |
| 4,701,724 A | | 10/1987 | Martin | |
| 5,107,273 A | * | 4/1992 | Roberts | 342/417 |
| 5,129,099 A | * | 7/1992 | Roberts | 455/81 |
| 5,446,464 A | | 8/1995 | Feldle | |
| 5,815,803 A | * | 9/1998 | Ho et al. | 455/78 |
| 6,115,584 A | * | 9/2000 | Tait et al. | 455/73 |
| 2003/0040294 A1 | * | 2/2003 | Staszewski et al. | 455/337 |

OTHER PUBLICATIONS

Matjaz Vidmar; Use Transmitting Power FETs For Antenna Switching; Microwaves & RF; Jul. 2000; pp. 81–82, 84, and 86.

* cited by examiner

*Primary Examiner*—Sonny Trinh
*Assistant Examiner*—Un C Cho
(74) *Attorney, Agent, or Firm*—Robert I. King

(57) ABSTRACT

A doubly balanced transceiver system having a transmit terminal (TX), a receive terminal (RX), and an an antenna terminal (ANTENNA), 180° hybrids (201, 240), 90° hybrids (204, 304, 235 and 335), a power amplifier (230, 330) and a RX/TX switch (220) for disabling the power amplifier so that signals received at the transmitter are reflected to the receive terminal (RX). The 180° hybrids (201, 240) preferably split and re-combine signals into parallel paths. A loopback test mode is preferably provided by use of an antenna isolation switch (302) to enable a power detect terminal (POWER_DETECT). This eliminates pricey and problematic GaAs switches, and allows the use of low cost silicon for the power amplifier. The doubly balance architecture also has the advantage of eliminating common-mode noise, and reflection problems with the PA gain stages. Additionally, greater power can be extracted from the power amplifier. Further the arrangement has less insertion loss compared to a GaAs switch. Also, dependant upon system specifications, it may be possible to eliminate harmonic filtering at the power amplifier output.

9 Claims, 1 Drawing Sheet

TRANSCEIVER CIRCUIT ARRANGEMENT AND METHOD

FIELD OF THE INVENTION

This invention relates to radio frequency electronic circuits, and particularly, though not exclusively, to such circuits for use in wireless data transceiver applications.

BACKGROUND OF THE INVENTION

In the field of wireless data transceiver circuits it is known that prior solutions have used a PIN diode and quarter-wavelength transmission lines as a switch between transmit and receive. Such a prior art solution is known, for example, from U.S. Pat. No. 4,701,724 "Injection Switch and Directional Coupler". However, these switches consume an large amount of DC power.

It is also known to use GaAs MESFETs to form a single-pole, double-throw switch. However, such GaAs MESFET switches are typically too expensive. It may also be a problem with such GaAs MESFET switches to provide enough power handling capability: a 1W signal has a 20V peak-to-peak swing across 50 ohms, thus requiring the FET switch supply to be at least 20V.

From U.S. Pat. No. 5,606,283 "Monolithic Multi-Function Balanced Switch and Phase Shifter" and U.S. Pat. No. 5,446,464 "Transceiver Module" it is known to use reflective switches. The article by Vidmar, in MICROWAVES & RF, JULY 2000, "Use Transmitting Power FETs for Antenna Switching", improves on the the design of U.S. Pat. No. 5,446,464 by eliminating the PIN diodes and using the PA devices to provide a reflection to the hybrid coupler and then to the receiver.

However, the approach known in the Vidmar article does not perform the necessary functions in a manner suited to low cost and low power radios. Additionally, extending the known designs mentioned above to allow for a range of functions typically required in a radio transceiver would require additional compromises in cost and performance.

A need therefore exists for a transceiver wherein the abovementioned disadvantage(s) may be alleviated.

STATEMENT OF INVENTION

In accordance with a first aspect of the present invention there is provided a transceiver circuit arrangement.

In accordance with a second aspect of the present invention there is provided a method for a transceiver circuit arrangement.

BRIEF DESCRIPTION OF THE DRAWINGS

One doubly balanced transceiver system incorporating the present invention will now be described, by way of example only, with reference to the accompanying drawings, in which.

DESCRIPTION OF PREFERRED EMBODIMENT

Figure 1:
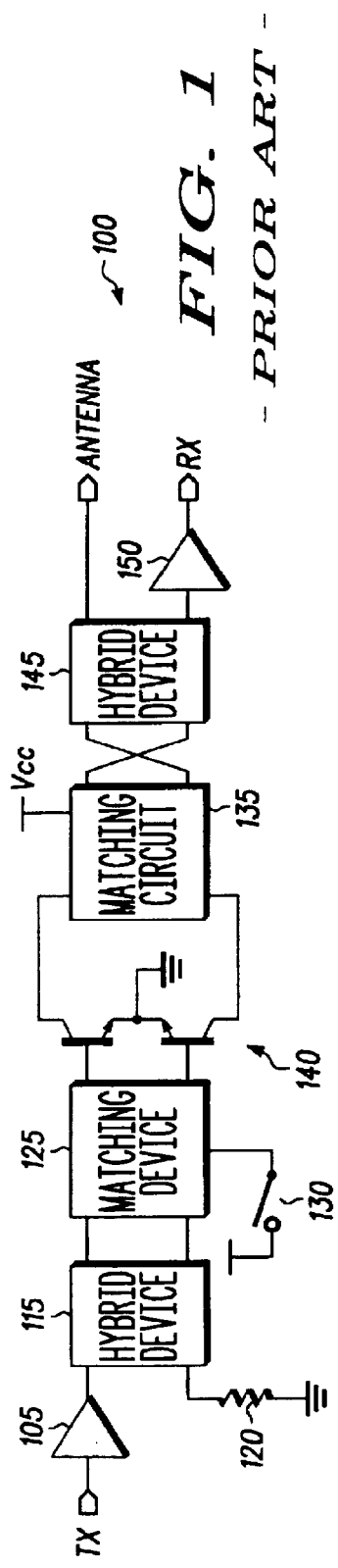
FIG. 1 shows a block schematic diagram of a prior art radio transceiver circuit.

Referring firstly to FIG. 1, a prior art transceiver circuit 100, for example known from the article by Vidmar, in MICROWAVES & RF, JULY 2000, "Use Transmitting Power FETs for Antenna Switching", includes a terminal TX for receiving a signal for transmission at a radio antenna. The terminal TX is coupled to the input of a driver amplifier 105. The output of the power amplifier 105 is coupled to an input of a 90° hybrid device 115, of which another input is coupled to a resistor 120. The balanced output of the 90° hybrid device 115 is coupled to a bias and matching circuit 125, which is coupled to receive an input voltage dependent on the state of a TX/RX control switch 130. The balanced output of the bias circuit 125 is coupled to a further bias and matching circuit 135 via power transistors 140. The balanced output of the bias circuit 135 is coupled to a 90° hybrid device 145. One output of the 90° hybrid device 145 is connected to a radio antenna; another output of the 90° hybrid device 145 is coupled to a low-noise amplifier 150, whose output is connected to a terminal RX for connection to receive circuitry.

It will be understood that the transceiver circuit 100 does not require any additional switching components for antenna switching between transmit and receive modes. In the transceiver circuit 100 the same transmitter power devices are biased in a different way during reception (compared with during transmission) to route the RF signal from the antenna to the RX terminal. In addition to reducing the number of switching components, this design can reduce insertion loss in receive and transmit modes. However, the transceiver circuit 100 does not perform the necessary functions in a manner suited to low cost and low power radio applications.

Figure 2:
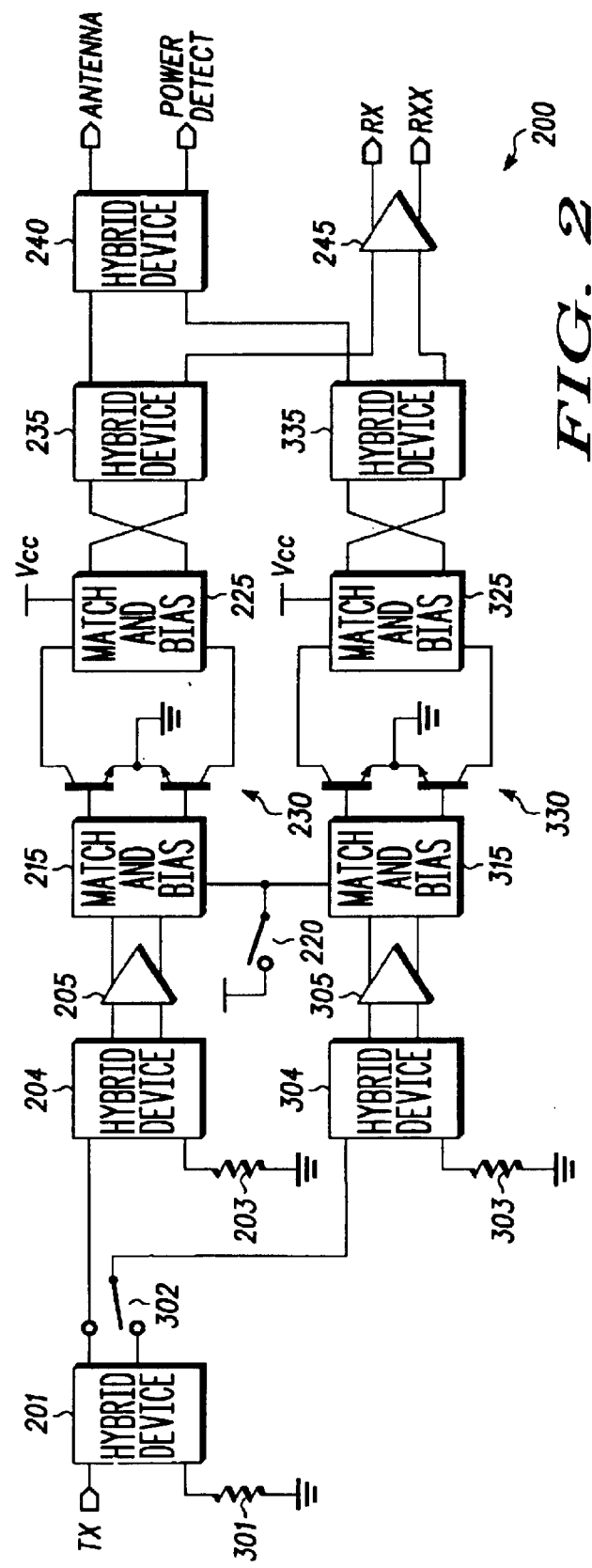
FIG. 2 shows a block schematic diagram of a radio transceiver circuit incorporating the invention.

Referring now to FIG. 2, a transceiver circuit arrangement 200 builds upon the design of the transceiver circuit 100 by making the circuit arrangement "doubly balanced". As will be explained in more detail below, the transceiver circuit arrangement 200 combines 90° hybrids and 180° hybrids in a new and advantageous way to accomplish desired functions in a low cost and low power radio transceiver.

The transceiver circuit arrangement 200 includes a terminal TX for receiving a signal for transmission at a radio antenna. The terminal TX is coupled to an input of a 180° hybrid device 201; another input of the 180° hybrid device 204 is coupled to a resistor 301. One of the balanced outputs of the 180° hybrid device 201 is coupled to an input of a 90° hybrid device 204; another input of the 90° hybrid device 204 is coupled to a resistor 203. Balanced outputs of the 90° hybrid device are coupled to inputs of a power amplifier 205. The balanced outputs of the power amplifier 205 are coupled to a match and bias circuit 215, which is coupled to receive an input voltage dependent on the state of a TX/RX control switch 220. The balanced output of the match and bias circuit 215 is coupled to a further match and bias circuit 225 via power transistors 230. The balanced output of the match and bias circuit 225 is cross coupled to a 90° hybrid device 235. One output of the 90° hybrid device 235 is connected to an input of a 180° hybrid device 240; another output of the 90° hybrid device 235 is connected to an input of a low noise amplifier 245, whose outputs are connected to output terminals RX and RXX. An output of the 180° hybrid device 240 is connected to an ANTENNA terminal to a radio antenna, and another output is connected to a power detection terminal POWER_DETECT (as will be described in greater detail below).

Another of the balanced outputs of the 180° hybrid device 201 is coupled, via an antenna isolation switch 302 (which will be explained in greater detail below) to an input of a 90° hybrid device 304; another input of the 90° hybrid device 304 is coupled to a resistor 303.

Balanced outputs of the 90° hybrid device are coupled to inputs of a power amplifier 305. The balanced outputs of the power amplifier 305 are coupled to a match and bias circuit 315, which is coupled to receive an input voltage dependent on the state of the TX/RX control switch 220. The balanced output of the match and bias circuit 315 is coupled to a further match and bias circuit 325 via power transistors 330. The balanced output of the match and bias circuit 325 is cross coupled to a 90° hybrid device 335. One output of the 90° hybrid device 335 is connected to an input of the 180° hybrid device 240; another output of the 90° hybrid device 335 is connected to an input of the low noise amplifier 245.

It will be understood that the 90° and 180° hybrid devices 201, 240, 204, 304, 235 and 335 are well known per se and need not be described here in further detail.

For normal transmit operation of the transceiver circuit arrangement 200, the signal for transmission starts at the terminal "TX". The power is equally split and rotated by 180° at the first hybrid 201. The signal is then equally split again, but rotated by 90° this time, by the second set of hybrids 204 and 304. RF match and bias for the PA devices 230 and 330 is then provided at circuits 215, 315, 225 and 325. The signal is then amplified and combined by 90° (at hybrids 235 and 335) and 180° (at hybrid 240) and then is sent to the ANTENNA terminal. With perfect matching and isolation, there will be no power detected at the POWER_DETECT terminal. However, in a practical implementation of the circuit arrangement 200 there will be power at the POWER_DETECT terminal related to the transmitted power in a linear way. Thus, it will be appreciated that the transceiver circuit arrangement 200 has eliminated a first switch otherwise needed to switch off the antenna and send PA power to a power detector.

For receive operation, the RX/TX control switch 220 is opened such that the power devices 230 and 330 are off. This is a DC switch, and is thus easy to implement in an integrated circuit (IC). This transceiver circuit arrangement 200 may in practice contain as many serial amplifiers (for the power amplifiers shown generally as 205 or 305) as are needed to achieve the desired gain, but the switching action of the TX/RX control switch should occur at the final devices. The received signal now starts at the antenna, and is split and shifted by 180 degrees by the first hybrid 240. The signal is further split and shifted by 90° by the second set of hybrids 235 and 335. The split signals then travel to the final PA devices 205 and 305, and are reflected by the 'off' devices. The signal now comes back to the 90° hybrids 235 and 335 and is recombined. This time the signal will appear at the lower outputs of the 90° hybrids 235 and 335 as shown in FIG. 2, and the signal is directed to the balanced LNA. The signals will still be 180° out of phase, and thus will be appropriate for the balanced LNA. Thus, it will be appreciated that the transceiver circuit arrangement 200 has eliminated a second switch otherwise needed to commutate between receiver and transmitter.

The use of both hybrids, 180° and 90°, is important to overall functionality. The 90° hybrid allows the switching action to take place with reflections of the signal. Use of a 180° hybrid here would not work in practice because that would require equal but opposite phase reflections to be provided (although this is possible in concept, it would be very difficult to implement). It will also be appreciated that in an integrated circuit application, the use of the 180° hybrid is important to cancel common-mode noise that is found in an IC environment that includes several other functional blocks (which is commonly accepted design practice in modern RF IC design).

The transceiver circuit arrangement 200 also allows accomplishment of another desirable function, i.e., "loopback". This is a test mode where the PA output is fed back to the receiver, but it is not allowed to broadcast during this test mode. To do this, the "antenna isolation control" switch 302 is switched so that the signal from the upper output (rather than the lower output) of the 180° hybrid 201 is applied to the 90° hybrid 304. The switch 302 as shown in FIG. 2 is an idealized representation of what can be easily accomplished in silicon by a driver device since the signal amplitude will still be small. Now the signals will appear at the final 180° hybrid 240 in phase. Thus no signal will be sent to the antenna, but will all be dumped into the power detector port. In a perfectly matched and isolated case, no signal would appear at the LNA 245 either, which is where some of the signal is also needed for "loopback". However, in an actual implementation, there will be some imbalance between the hybrids, the PA devices, etc. along with signal coupling or leakage. This is actually a good thing in practice, because there is more power available from the PA (205 and 305) than the LNA (245) can handle. Thus, it will be appreciated that the transceiver circuit arrangement 200, has also eliminated a switchable attenuator that would otherwise have been needed at the input of the LNA 245. It may also be be noted that in "loopback" mode the signal will arrive in phase at the LNA input. Imbalances and leakages will allow some signal to get to the output of the LNA, but will cause further attenuation of the large signal.

In conclusion, it will be understood that the doubly balanced transceiver circuit arrangement 200 described above provides the following advantages:

Expensive and potentially problematic GaAs switches are eliminated. This also allows the use of low cost silicon for the PA devices. GaAs would allow on-chip matching circuits along with switches for a possible implementation of the system on GaAs. Silicon must have the match off-chip for low loss, which previously made it difficult to place the switch where it was needed in the design, since the signal had already gone off-chip. The transceiver circuit arrangement 200 eliminates these difficulties.

The doubly balanced architecture also has the advantage of eliminating common-mode noise, and reflection problems with the PA gain stages. Additionally, in the transceiver circuit arrangement 200 a greater amount of power can be extracted from the PA devices 230 and 330 compared with what a single PA device could provide.

A further advantage is that the transceiver circuit arrangement 200 has less insertion loss to the LNA 245 or from the PA (205 or 305), compared to a GaAs switch.

Also, dependant upon the system specifications, it may be possible to eliminate harmonic filtering at the output of the PA (205 and 305), since second and third harmonics are cancelled by the 180° hybrid and the 90° hybrids, respectively.

It will be further appreciated that other alternatives to the embodiment of the invention described above will be apparent to a person of ordinary skill in the art.

What is claimed is:

1. A transceiver circuit arrangement, comprising:
  a first terminal for receiving a signal for transmission;
  a second terminal for coupling to an antenna for transmission, and reception of signals;
  a third terminal for producing a received signal;
  a first 90 degree hybrid arrangement coupled to a first 180 degree hybrid arrangement for applying a 90 degree phase shift to signals applied thereto;
  a second 90 degree hybrid arrangement coupled to a first 180 degree hybrid arrangement for applying a 90 degree phase shift to signals applied thereto;

a third 90 decree hybrid arrangement coupled to a second 180 degree hybrid arrangement for applying a 90 degree phase shift to signals applied thereto;

a fourth 90 degree hybrid arrangement coupled to a second 180 degree hybrid arrangement for applying a 90 degree phase shift to signals applied thereto; the first 180 degree hybrid arrangement coupled to the first terminal for applying a 180 degree phase shift and for splitting and re-combining signals applied thereto;

the second 180 degree hybrid arrangement coupled to the second terminal for applying a 180 degree phase shift and for splitting and re-combining signals applied thereto;

amplifier means coupled between the first and second terminals for amplifying signals received at the first terminal for transmission via the second terminal in transmission mode; and transmit/receive switch means for disabling the amplifier means in receive mode whereby signals received at the second terminal are reflected to the third terminal.

2. The transceiver circuit arrangement of claim 1, further comprising:

antenna isolation switch means coupled to the first 180 degree hybrid arrangement for selectively applying different outputs thereof and a same output thereof to the first and second 90 degree hybrid arrangements; and a fourth terminal coupled to the second 180 degree hybrid arrangement for producing a power detect signal for use in loopback mode.

3. The transceiver circuit arrangement of claim 1, arranged to reduce common mode noise.

4. The transceiver circuit arrangement of claim 1, wherein the transceiver is a wireless data transceiver.

5. An integrated circuit comprising the transceiver circuit arrangement of claim 1.

6. A method for a transceiver circuit arrangement, comprising:

providing a first terminal receiving a signal for transmission;

providing a second terminal coupled to an antenna for transmission and reception of signals;

providing a third terminal producing a received signal;

providing 90 degree hybrid means coupled between the first arid second terminals producing a 90 degree phase shift in signals passing therebetween;

providing 180 degree hybrid means coupled between the first and second terminals producing a 180 degree phase shift in signals passing therebetween, the 180 degree hybrid means comprising:

a first 180 degree hybrid arrangement coupled the first terminal applying a 180 degree phase shift and splitting and re-combining signals applied thereto, and a second 180 degree hybrid arrangement coupled to the second terminal applying a 180 degree phase shift and spitting and re-combining signals applied thereto;

the 90 degree hybrid means comprising:

a first 90 degree hybrid arrangement coupled to the first 180 degree hybrid arrangement applying a 90 degree phase shift to signals applied thereto, a second 90 degree hybrid arrangement coupled to the first 180 degree hybrid arrangement applying a 90 degree phase shift to signals applied thereto, a third 90 degree hybrid arrangement coupled to the second 180 degree hybrid arrangement applying a 91 degree phase shift to signals applied thereto, and a fourth 90 degree hybrid arrangement coupled to the second 180 degree hybrid arrangement applying a 90 degree phase shift to signals applied thereto;

providing amplifier means coupled between the first and second terminals amplifying signals received at the first terminal for transmission via the second terminal in transmission mode; and providing transmit/receive switch means for disabling the amplifier means in receive mode whereby signals received at the second terminal are reflected to the third terminal.

7. The method of claim 6, further comprising:

providing antenna isolation switch means coupled to the first 180 degree hybrid arrangement selectively applying different outputs thereof and a same output thereof to the first and second 90 degree hybrid arrangements; and providing a fourth terminal coupled to the second 180 degree hybrid arrangement producing a power detect signal for use in loopback mode.

8. The method of claim 6, further comprising reducing common mode noise.

9. The method of claim 6, wherein the transceiver is a wireless data transceiver.

* * * * *